April 12, 1966     T. H. ROE ETAL     3,245,150
GRADE GAUGE
Filed Jan. 7, 1963     2 Sheets-Sheet 1
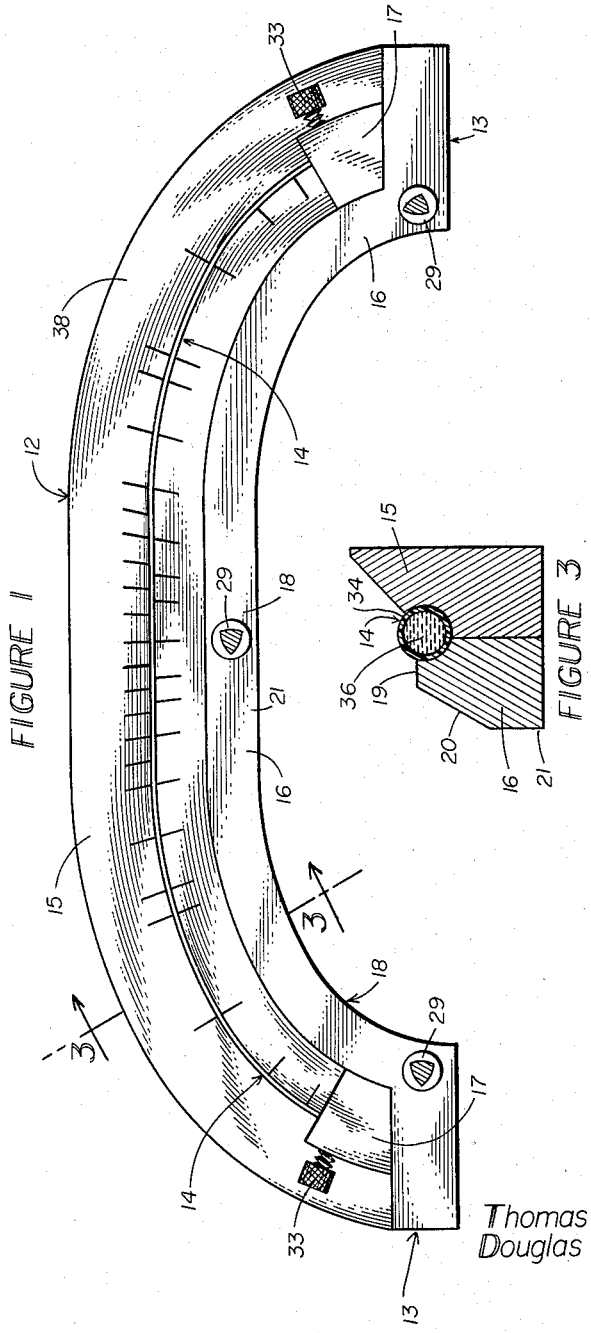
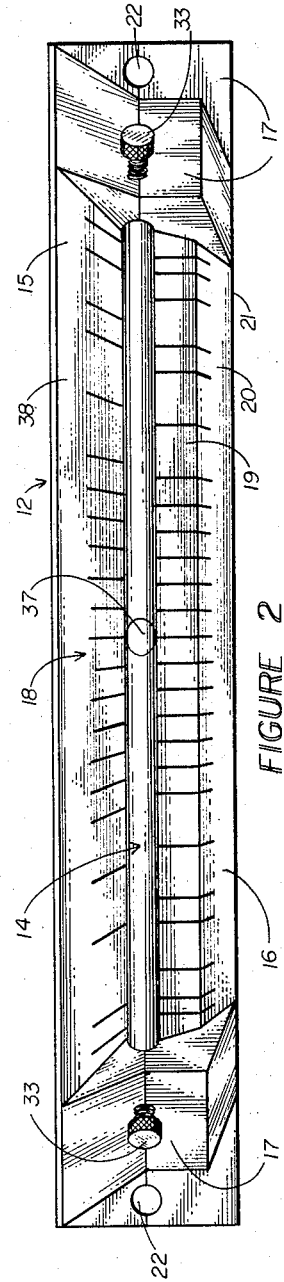
Thomas H. Roe and
Douglas H. Campbell   INVENTOR.
ATTORNEY.

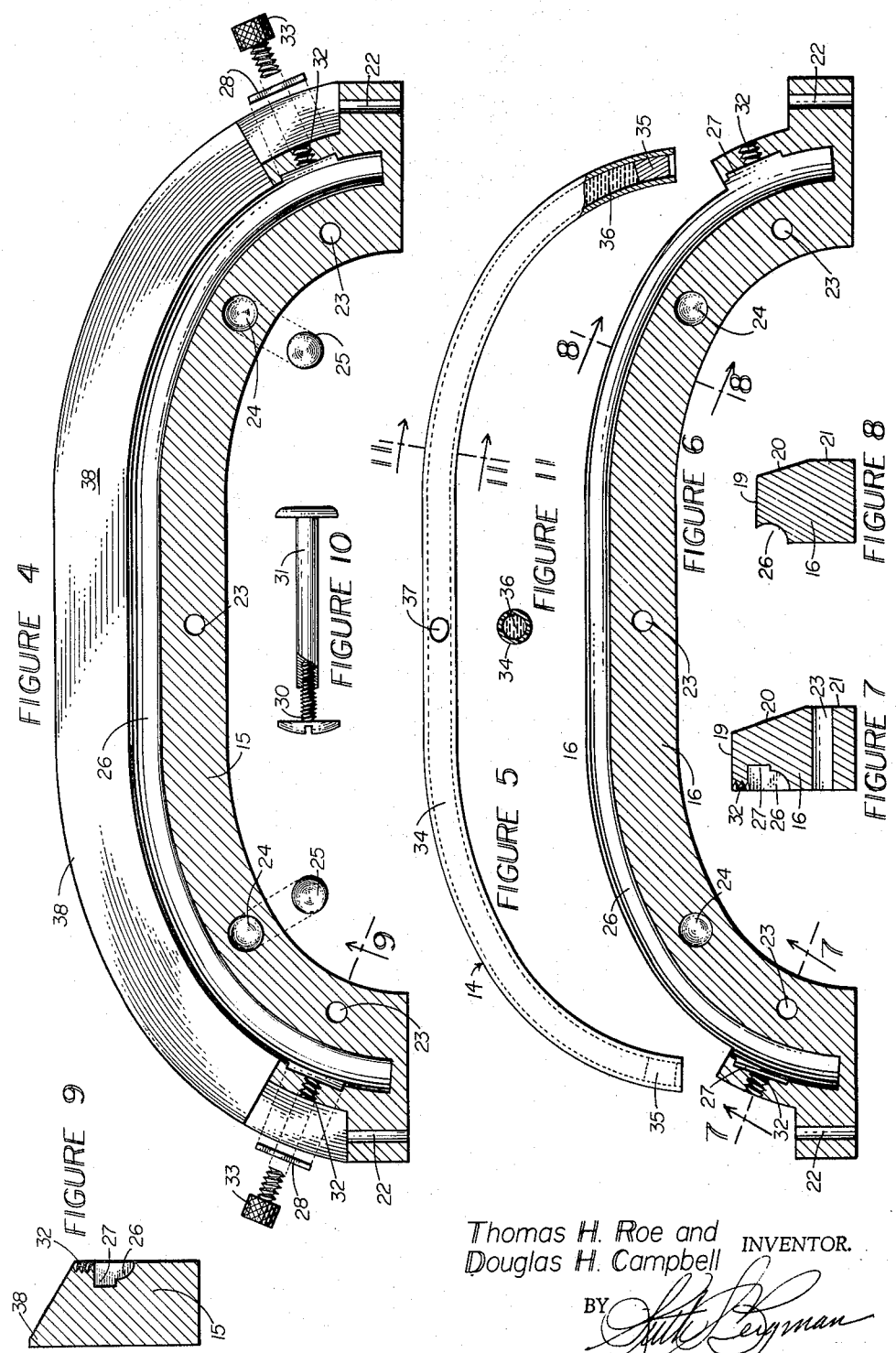

United States Patent Office 3,245,150
Patented Apr. 12, 1966

3,245,150
GRADE GAUGE
Thomas H. Roe, E. 1518 12th Ave., Spokane, Wash., and Douglas H. Campbell, Spokane, Wash.; said Campbell assignor to said Roe
Filed Jan. 7, 1963, Ser. No. 249,648
3 Claims. (Cl. 33—207)

This invention relates generally to an improvement in grade gauges for use with earth-moving equipment, and more particularly, to such devices of a rigid-frame, bubble type adapted to be rigidly attached to the framework of the earth-moving equipment during use.

Grade gauges, in general, of the bubble type having an upwardly extending curved tube partially filled with fluid so as to form a bubble therein, have been known since times immemorial. The general grade gauge, comprising a simple bubble level has not, however, in unmodified form, proved itself particularly adaptable to use with modern mechanical earth-moving devices, and it therefore becomes the object of this invention to provide certain novel improvements of this device whereby its range and extent of utility are heightened. To accomplish these ends:

It is a first object of our invention to provide a bubble-type slope indicator for earth moving equipment which will simply and effectively determine machine slope to a high degree of accuracy and yet be of a relatively small, compact size.

It is a second object of our invention to provide a device of the nature aforesaid having a sealed plastic tube partially filled with liquid constructed and arranged in such fashion that the size of the bubble therein contained may be adjustably regulated to a desired size, should it change by reason of internal or external physical condition.

It is another object of our invention to provide a fluid for filling plastic bubble tubes which is chemically stable relatively slightly affected by external physical change and of simple, economical manufacture.

It is another object of our invention to provide a grade gauge of the nature aforesaid that displays slope scales so that they may be easily read by an operator and yet be related to the basic structure so as to aid in protecting the plastic bubble tube from external shock or physical force.

Another object of our invention is to provide a novel base for carrying a relatively long bubble tube so that it may be simply and accurately positioned within the base.

Another object of our invention is to provide a device of the nature aforesaid of simple and rugged construction with interchangeable, easily replaceable parts and of a simple and economical manufacture.

Other objects and advantages of our present invention will be apparent from consideration of the following detailed description of a specific embodiment thereof.

In the accompanying drawings, which form a part of the specification, and in which like numbers of reference refer to similar parts throughout:

FIGURE 1 is an orthographic front view of our invention.

FIGURE 2 is an orthographic top view of the same device shown in FIGURE 1.

FIGURE 3 is a cross-sectional view taken on the line 3—3 of FIGURE 1 in the direction indicated by the arrows thereon.

FIGURE 4 is an orthographic projection, with screws, screw plates and bearings related thereto, of the back half of the body casting of our invention.

FIGURE 5 is an orthographic view of the formed plastic bubble tube of our invention, partially cut away to show the method of sealing the ends thereof.

FIGURE 6 is an orthographic view of the forward portion of the body of our invention, looking outwardly from the inside of the casting.

FIGURE 7 is a cross-sectional view of FIGURE 6 taken on the line 7—7 thereon in the direction indicated by the arrows.

FIGURE 8 is another cross-sectional view of the forward portion of our invention taken on the line 8—8 of FIGURE 6 in the direction indicated by the arrows thereon.

FIGURE 9 is a cross-sectional view of the rearward portion of the body of our invention taken on the line 9—9 of FIGURE 4 in the direction indicated by the arrows thereon.

FIGURE 10 is a partially cut away orthographic view of the screw fixtures which hold the two halves of our invention together.

FIGURE 11 is a cross-sectional view of the bubble tube of FIGURE 5 taken on the line 11—11 thereon in the direction indicated by the arrows.

Referring now to the drawings in greater detail and particularly to those of FIGURES 1 and 2 it will be seen that our invention comprises essentially the upwardly extending arcuate body portion 12 having the fastening portions 13 at its lowermost extremities and carrying the arcuate bubble tube 14 in a visible position in its medial region. This type of grade gauge is adapted to be mounted by the fastening portions 13 upon the portion of a machine (not shown), the level of which is to be determined. Most generally, it is mounted upon some horizontal portion of the framework of an earth-moving machine to indicate the relative angular disposition of such frame with a horizontal, the blade of the machine usually being assumed to be horizontally positioned with regard to the frame or else positioned with some known angular relationship. The invention, just as well however, could be mounted directly upon a grading blade or any other part of the machine to indicate its relation to horizontal.

In the use of grading machinery, it is most generally desired to grade a surface only very slightly sloped, such as a road crown or drainage surface, or one quite highly sloped such as a roadway cut. Because of this requirement, it has become common in grade gauges to use a varying curvature for the bubble tube, with a relatively shallow curvature in the central portion and a substantially steeper curvature on each of the end portions so that the tube will be more accurate for slight curves and yet register the slope of relatively steep curves. Various discrete or continuous curves may be used for this purpose, but we prefer to use a shallow-nosed parabola because of its continuous nature and ease of calibration by mathematical means if this be desired.

With these factors in mind, the present invention is concerned primarily with the provision of a structurally rigid substantial body that displays the bubble tube and scales so that a bubble may be easily read and yet be protected by the body; with the development and sealing of a plastic bubble-tube containing a fluid having chemical inertness, rapidity of bubble movement and reasonable stability of bubble size; and with a screw activated pressure means for regulating slight changes in bubble size.

The body portion of our invention is cast preferably from metal with a rearward half 15 and a mating forward half 16. The general curvature desired for the bubble tube 14 will of necessity determine the basic shape of both the rearward body portion 15 and forward body portion 16. The shape is not critical so long as the curve is substantially steeper at its end portions than in the middle, but as previously stated, we prefer to use a mathematical curve, a flat-nosed parabola preferably, for ease in mathematical gradiation of the scales, if this be desired. Once this basic curvature of the bubble tube 14 is determined the essential shapes of the body casting, 15, 16 fall readily into place.

The external surface of the forward half body casting 16 is seen in FIGURES 1 and 2 to comprise the fastening portion 13 communicating with the screw containing shoulder portion 17 and thence to the arcuate body portion 18 communicating with identically symmetrical end parts at the other end. The outer surface of the arcuate body portion 18 has the nearly flat rim 19 for gradiations and from it slopes off gently along the surface 20 to the vertical lower surface 21.

On the inner surface of this casting there is the half cylindrical hole 22 in the fastening portion 13 to receive a fastening bolt to affix the device to a machine; the cylindrical fastener holes 23 to receive the fasteners 29 to holding the two halves of the body 15, 16 together; and the half hemispherical holes 24 adapted to receive the steel ball 25, in cooperation with similar holes 24 in the rearward body half 15, to hold the two members 15, 16 in strict alignment during assembly and thereafter. The bubble tube chamber 26 is provided along the upper inner periphery surface of the arcuate body portion 18 and extends at each end into the screw shoulder 17 as illustrated. In this screw shoulder 17, a recess 27 for the screw plate 28 is provided and a half-cylindrical threaded hole 32 is provided through the radially outward shoulder 17 to receive the bubble screw 33 in cooperation with a similar portion of the rearward body half 15.

The inner surface of the rearward body half 15, as for the portion communicating with the forward body half, is symmetrically similar thereto as would be a mirror image thereof. It has the corresponding half cylindrical holes 22 in the fastening portion 13 to receive a fastening device; the cylindrical fastener holes 23 cooperating with those in the forward body half to allow the two portions to be fastened by the members 29; and the half hemispherical holes 24 cooperating with the similar holes in the forward body portion 16 to aid in holding the two parts in proper alignment. There is also in the screw shoulder 17, screw plate recess 27 and the half-cylindrical threaded hole 32 adapted to cooperate with the similar portion of the forward body half 16 to threadedly receive the bubble screw 33 when the two members 15, 16 be joined. Cross-sections of these various members, through the bubble screw hole 32 and through the forward arcuate body portion 18 of the rearward body part, and through the bubble screw hole 32 of the forward part are provided respectively in FIGURES 9, 8 and 7 to more completely show the exact structure of our invention.

The steel ball 25 is an ordinary ball bearing of commerce. The screw plate 28 is a small rectangular sheet adapted to distribute the pressure caused by the bubble screw 33 over a relatively larger area of the bubble tube 14 than would occur if only the end of the screw 33 bore thereon. The bubble screw 33 is an ordinary machine screw of commerce, adapted to threadedly engage within the threaded hole 32 created when the forward body portion 16 and rearward body portion 15 are assembled; it preferably has an Allen head to allow use of an Allen wrench to more readily manually move the member against substantial pressures.

The bubble tube 14 of our invention is seen in side view in FIGURE 5 and in cross section in FIGURE 11. It comprises a section of relatively thick-walled, sturdy transparent tubing 34, closed off at its end portions with the plugs 35, and containing a fluid 36 of such volume as to allow a bubble 37 of air or some less dense insoluble second liquid to remain therein. The bubble tube 34 may be constructed of glass, plastic or any other structurally rigid transparent medium, but we prefer plastic because of the construction herein involved and the greater physical rigidity and durability. We prefer to use a plastic tube of the polyethylene variety and end plugs of the same material, held in place with an epoxy type resin cement.

The nature of the tubing and the sealing of the plugs 35 therein is rather critical. If the tubing permits the passage of air, there will be permeability through the tube walls which will change the size of the bubble 37 and possibly even cause adverse chemical reactions in the contained fluid 36; the same problem presents itself if the plugs 35 be not completely sealed within the tube 34 to form a completely enclosed chamber. It has been found that a better seal is obtained if the plugs 35 be tapered slightly and pressed inside the ends of the tubes 34 with the space on the outer surface thereof and within the end of the tube 34 filled with appropriate epoxy resin adhesive.

The use of a plastic bubble tube 34 in conjunction with an appropriately formed bubble tube chamber 26 does not require the accurate forming of the curve of the bubble tube 34 before its placement within the device. It will be seen from the cross section of FIGURE 3 that more than half the diameter of the bubble tube 34 is enclosed by the body castings 15, 16. By reason of this the bubble tube 34 will be held snugly within the bubble tube chamber 26 and the exact curvature required formed when the grade gauge be assembled.

The fastening devices 29 for holding the two body portions 15, 16 of our invention together are illustrated in FIGURE 10. We prefer to use a long shouldered head 31 which will fit snugly within the cylindrical holes 23 of both body portions and pass completely therethrough to hold the two members 15, 16 in good mechanical alignment. The screw portion 30 is then inserted to hold the parts together and prevent any movement axially to said fastener.

The nature of the fluid contained within the bubble tube 34 is rather critical. The fluid must be such as to allow the bubble 37 to move rapidly and come to rest in its final position rapidly within the tube 34, must not change physically or chemically from adverse environmental conditions under which it must operate, and must maintain the size of the bubble 37 within a reasonable size range when acted upon by uncontrollable external forces. After extensive experimentation with many fluids we have found that a mixture of substantially 60 percent ethyl alcohol and 40 percent of automotive anti-freeze of the type manufactured under the name "Prestone" by the Union Carbide Corporation is best suited to the purposes of our invention. This product must be mixed, aged in a sealed filled container for ten days, the surface film then formed removed, aged five more days in a sealed filled container and the surface film then formed again removed and aged in a sealed filled container again for two weeks before use. It should then be placed within the bubble tubes 34 without aeration. Other products containing ethylene glycol will function, as will the chemical by itself, but none so well as the aforesaid commercial product.

Appropriate scales to determine numerically the amount of inclination of the grade gauge may be placed upon the horizontal surface 21 and upwardly flaring surface 38. We prefer to graduate the upper surface 38 according to percentage of slope and the lower surface 21 according to ratio of slope, because of the commonness of use of these figures in the construction industry. The gradiations may be arrived at mathematically through laws well know or experimentally upon the testing bench.

To assemble our invention the forward and rearward castings 16, 15 are formed to the shapes and configurations indicated. A bubble tube 34 of appropriate length is cut, one plug 35 placed therein, the chamber created filled with fluid, and the other plug 35 placed to seal the tube. The tube 34 is then placed within the bubble tube chamber 26 of the rearward body half 15 and the two steel balls 25 placed within the recesses 24 provided therefore. The screw plates 28 are next positioned within their recesses 27 and the forward body portion 16 is then placed in position over this assembly, and it will be automatically aligned by the steel balls 25. The head portion 31 of the fasteners 29 is then inserted through each of the holes 23 and the screws placed therein to removably fasten the body portions 15, 16 together. The bubble screws 33 are then placed within the holes 32 and screwed in until the bubble 37 is of an appropriately small size to be readily readable. The device is now assembled and ready for operation to indicate grade when placed in position, as aforesaid, upon some earth-moving machine.

While a specific embodiment of our invention has been disclosed in the foregoing specification, it should be understood that the specific terminology and structure is not intended to be restrictive or confining, and that various rearrangements of parts, modifications, of detail and substitutions of material may be resorted to, without departing from the essence, scope and spirt of our invention herein disclosed and hereinafter claimed.

Having thusly described our invention, what we desire to protect by Letters Patent, and

What we claim is:

1. A grade gauge of the nature aforesaid, for use on earth grading machinery, comprising, in combination, a rigid base adapted to be secured to the frame of an earth moving machine, said base including a pair of similar elements each having upper and lower arcuate surfaces extending between similar transverse ends having lower planar surfaces parallel to the central uppermost portion of the curve extending therebetween, said curve comprising a continuous mathematical curve having a slope gradient of zero at its center and increasing outwardly therealong in proportion to the distance travelled along said curve, the upper arcuate surface being recessed therealong, said recess being formed with a constant circular radius along the arcuate axis adapted to receive a cylindrical bubble tube, to contain a cross section thereof within said recess greater than one half to display the uncontained portion so that a bubble therein may be seen; a sealed transparent tube mounted within the space of said recess, said tube having substantially constant interior and exterior radii, the exterior radii thereof being substantially equal to the radii of said recess, said tube conforming in curvature to that of said recess and extending completely thereabout; liquid contained by said tube adapted to form a bubble therein; a screw plate mounted within an appropriate recess within said base substantially tangent to said bubble tube and a screw communicating therewith, threadedly engaged in said body and projecting therefrom, adapted to exert pressure to cause deformity upon said bubble tube to regulate the size of the contained bubble in response to movement of said screw; and graduated scales contained by said base adjacent said tube to indicate the degree of angularity existing between a line drawn through each of said terminal ends in relation to the horizontal.

2. A grade gauge indicator of the nature aforesaid, adapted for use on earth grading machines, comprising in combination:

a body portion composed of two similar releasably joined halves forming a rigid base including a pair of spaced similar elements with lower planar surfaces adapted to be secured to the frame of an earth-moving machine and an arcuate portion having the upper-most central part thereof parallel with the lower surface of said bases and increasing curvature outwardly therefrom, extending between said transverse bases;

a recess along the upper surface of said arcuate portion, said recess being formed with a constant circular radius along the arcuate axis, adapted to receive a bubble tube, contain a cross section thereof greater than one half, and display the uncontained portion for visual observation;

an upwardly extending scale carrying arcuate surface structurally communicating with said arcuate body portion rearwardly adjacent said bubble tube recess and an arcuate horizontal scale carrying surface forwardly adjacent said recess;

a sealed transparent tube mounted within the space of said recess, said tube having substantially constant internal and external radii and containing a liquid partially filling the enclosed chamber thereof so as to form a bubble therein;

a screw plate mounted within an appropriate recess in each end of the base portion of said body substantially tangent to said bubble tube and a screw communicating therewith, threadedly engaged within said body and projecting therefrom, adapted to exert pressure to cause deformity of said bubble tube to regulate the size of the contained bubble in response to movement of said screw;

and graduated scales carried by said scale surfaces adjacent said bubble tube to indicate the degree of angularity existing between a line drawn through each of said bases in relation to the horizontal.

3. A grade gauge of the nature aforesaid, for use on earth grading machinery, comprising, in combination, a rigid base adapted to be secured to the frame of an earth moving machine, said base including a pair of similar elements each having upper and lower arcuate surfaces extending between similar transverse ends having lower planar surfaces parallel to the central upper-most portion of the curve extending therebetween, said curve comprising a continuous mathematical curve having a slope gradient of zero at its center and increasing outwardly therealong in proportion to the distance traveled along said curve, the upper arcuate surface being recessed therealong, said recess being formed with a constant circular radius along the arcuate axis adapted to receive a cylindrical bubble tube, to contain a cross-section thereof within said recess greater than one-half and to display the uncontained portion so that a bubble therein may be seen; a sealed flexible transparent tube mounted within the space of said recess, said tube having substantially constant interior and exterior radii, the exterior radii thereof being substantially equal to the radii of said recess, said tube conforming in curvature to that of said recess and extending completely thereabout; liquid contained by said tube adapted to form a bubble therein; a screw plate mounted within an appropriate recess within said base substantially tangent to said bubble tube and a screw communicating therewith, threadedly engaged in said body and projecting therefrom, adapted to exert pressure to cause deformity upon said bubble tube to regulate the size of the contained bubble in response to movement of said screw; and graduated scales contained by said base adjacent said tube to indicate the degree of angularity existing between a line drawn through each of said terminal ends in relation to the horizontal, aforesaid pair of similar elements comprising two releasably joined similar halves adapted to form said bubble tube to its desired curvature and maintain it therein upon assembly.

References Cited by the Examiner

UNITED STATES PATENTS

| | | | |
|---|---|---|---|
| 377,870 | 2/1888 | St. John | 33—212 |
| 392,124 | 10/1888 | Jackson | 33—211 |
| 764,556 | 7/1904 | Cable | 33—212 |
| 1,630,172 | 5/1927 | Custer | 33—212 |
| 1,674,550 | 6/1928 | Hunt et al. | 33—211 |
| 1,885,428 | 11/1932 | Gallasch | 33—211 |
| 1,902,387 | 3/1933 | Von Hofe et al. | 33—211 |
| 1,922,997 | 8/1933 | Widner | 33—212 |
| 2,357,817 | 9/1944 | Foster | 33—206 |
| 2,611,972 | 9/1952 | Gubrud | 33—211 |

FOREIGN PATENTS 801,221   7/1936   France.

ISAAC LISANN, *Primary Examiner.*